E. P. LANDFEAR.
NUT-LOCK.

No. 185,936.      Patented Jan. 2, 1877.

Witnesses
John Becker
Fred. Haynes

Edward P. Landfear
by his Attorneys
Brown & Allen

UNITED STATES PATENT OFFICE.

EDWARD P. LANDFEAR, OF JERSEY CITY, NEW JERSEY.

IMPROVEMENT IN NUT-LOCKS.

Specification forming part of Letters Patent No. 185,936, dated January 2, 1877; application filed November 23, 1876.

*To all whom it may concern:*

Be it known that I, EDWARD P. LANDFEAR, of Jersey City, in the county of Hudson and the State of New Jersey, have invented an Improvement in Lock-Nuts and Bolts for Fish-Plates and other purposes; and I do hereby declare that the following is a full, clear, and exact description of the same, reference being had to the accompanying drawing, which forms part of this specification.

My invention is intended more particularly to supply a secure means of locking nuts to bolts of fish-plates; but it may be applied to bolts used for other purposes. It is designed to prevent the displacement or removal of the locking device, or any portion thereof, either by jarring or the intention of evil-disposed or mischievous persons, unless supplied with special means for taking off the locked nuts.

The invention consists of longitudinally-grooved bolt, a radially slotted or mortised nut, and a split or bifurcated spring-key, which, after the nut is screwed upon the bolt, is inserted through the radial slot or mortise in the nut, one of the bifurcations of said key being provided with an outwardly-projecting bit, which engages the nut within the threaded hole of the same, and the ends of both said bifurcated portions of said key engaging the bolt in the aforesaid longitudinal groove formed in said bolt, as more fully hereinafter described.

Figures 1, 3:
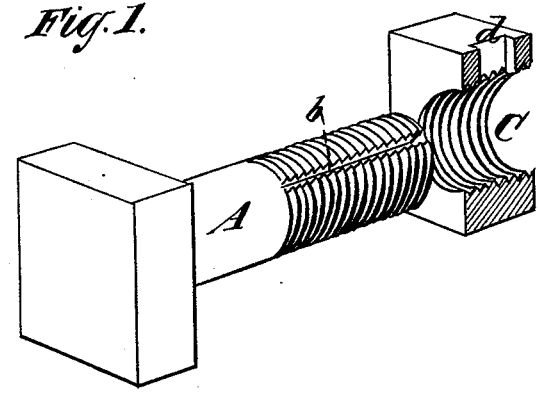
Figure 2:
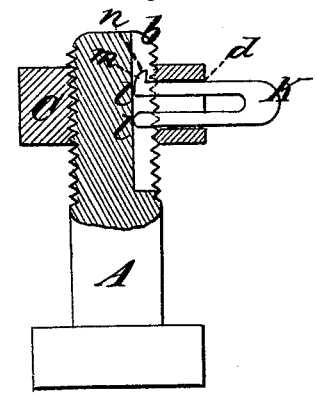

Figure 1 in the accompanying drawing represents the bolt. Fig. 2 represents a sectional view of the bolt with nut screwed on and key inserted, the nut being shown in section. Fig. 3 is a sectional view of the nut.

A is the bolt, having a longitudinal groove, b, cut in its threaded part, leaving a mutilated thread on said bolt. C is the nut, in the side of which is cut, radially to the central axis of the bolt, the mortise or slot d, extending through the side of the nut into the threaded hole formed therein. K, Fig. 2, is the bifurcated spring-key, having the bifurcations l l, and having formed on one of said bifurcations the bit m, said bit having on its outer part an inclined plane, n, which enables the key to be inserted more easily than if the outer part of the bit were left square. The nut being screwed on, the key is inserted in the slot or mortise d, as shown in Fig. 2, the bifurcations l l springing toward each other to allow the bit to pass, and when the ends of said bifurcations enter the groove b in the bolt A, the bifurcations spring asunder, bringing the bit m into engagement with the inside of the nut, which prevents the withdrawal of the key except by special appliances used therefor, and the ends of the said bifurcations, engaging the bolt in the groove b, prevent the turning of the nut on the bolt. The spring-key may have a bit on each of its bifurcations.

I claim—

The combination of the nut C, having the radial slot or mortise d, the bifurcated spring-key K, having the ends l l of its bifurcations engaging the groove b to lock the nut, the bit n on said key engaging the interior of the nut to lock the key, and the bolt A, having the longitudinal groove b in its threaded part, substantially as and for the purpose specified.

EDWARD P. LANDFEAR.

Witnesses:
HENRY T. BROWN,
MICHAEL RYAN.